US007445850B2

(12) United States Patent
Makino

(10) Patent No.: US 7,445,850 B2
(45) Date of Patent: Nov. 4, 2008

(54) SWITCH CONTAINER FOR HERMETICALLY ENCAPSULATING SWITCH MEMBERS AND METHOD FOR PRODUCING THE SAME

(75) Inventor: Yusuke Makino, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 225 days.

(21) Appl. No.: 11/105,387

(22) Filed: Apr. 14, 2005

(65) Prior Publication Data

US 2005/0230138 A1 Oct. 20, 2005

(30) Foreign Application Priority Data

Apr. 14, 2004 (JP) ............................ 2004-119208

(51) Int. Cl.
*B32B 9/00* (2006.01)

(52) U.S. Cl. ...................................................... 428/469

(58) Field of Classification Search ................. 428/469; 174/55.5; 156/663; 427/404
See application file for complete search history.

(56) References Cited

U.S. PATENT DOCUMENTS

| | | | | |
|---|---|---|---|---|
| 3,590,184 | A * | 6/1971 | Wachta et al. | 218/136 |
| 3,857,005 | A | 12/1974 | Peche | |
| 4,717,695 | A | 1/1988 | Oda | |
| 4,843,047 | A | 6/1989 | Oda | |
| 5,461,015 | A | 10/1995 | Kinsman et al. | |
| 5,565,392 | A | 10/1996 | Kinsman et al. | |
| 5,658,835 | A | 8/1997 | Onitani et al. | |
| 6,506,481 | B2 * | 1/2003 | Makino et al. | 428/210 |
| 6,733,871 | B2 | 5/2004 | Makino | |
| 2001/0027960 | A1 * | 10/2001 | Makino et al. | 218/139 |
| 2002/0092830 | A1 | 7/2002 | Makino | |

FOREIGN PATENT DOCUMENTS

| | | |
|---|---|---|
| JP | 61-168560 | 7/1986 |
| JP | 10-505052 | 5/1998 |
| JP | 10-194828 | 7/1998 |
| JP | 2002-167286 | 6/2002 |
| JP | 2003-2768 | 1/2003 |
| JP | 2003-212671 | 7/2003 |

OTHER PUBLICATIONS

"Ceramic Engineering Handbook", edited by Japan Ceramic Association, published by Kihodo, Apr. 1989, pp. 1559-1561.

* cited by examiner

*Primary Examiner*—Keith D. Hendricks
*Assistant Examiner*—Daniel Miller
(74) *Attorney, Agent, or Firm*—Sughrue Mion, PLLC

(57) ABSTRACT

A switch 1 includes a ceramic cylindrical tube 3, first and second end caps 5 and 7 that cover the open end in an axial direction of the ceramic cylindrical tube 3, a movable electrode 9 which slides easily on first end cap 5 and a fixed electrode 11 attached to second end cap 7. The ceramic cylindrical tube 3 is a ceramic fired body that contains 45 to 65% by weight of alumina and 35 to 55% by weight of crystallized glass. First and second end caps 5 and 7 are attached to both ends in the axial direction of the ceramic cylindrical tube 3. A low temperature metallizing layer is formed on the ends thereof, and a plating layer is formed on top of the metallizing layer where first and second end caps 5 and 7 are brazed.

14 Claims, 6 Drawing Sheets

SWITCH CONTAINER FOR HERMETICALLY ENCAPSULATING SWITCH MEMBERS AND METHOD FOR PRODUCING THE SAME

BACKGROUND OF THE INVENTION

1. Field of the Invention

The present invention relates to a switch container for hermetically encapsulating switch members, particularly to a switch container comprising a hollow ceramic body for hermetically encapsulating switch members, and a method for producing the switch container.

2. Description of the Related Art

Conventionally, a switch such as a vacuum switch and a circuit contactor used for shutting-off or switching electrical power, has generally employed a cylindrical ceramic tube comprising at least 85% by weight of alumina, in view of the strength, insulation and air-tightness required for the switch container.

In a conventional process of forming the cylindrical ceramic tube, a slurry of alumina is spray-dried into a powder, and then the powder is placed into a rubber mold and pressed into a green (unfired) cylindrical ceramic body. A firing temperature exceeding 1500° C. is normally needed to fire or rather sinter the green cylindrical ceramic body, due to the high alumina content thereof.

In order to encapsulate, and more particularly, hermetically seal various switch members inside the switch container, both open ends of the ceramic cylindrical tube are circularly metallized. Furthermore, two metallic end caps are each brazed onto the metallized ends so as to hermetically seal the switch members therein, as disclosed in Japanese Patent Application Laid-Open (Kokai) No. 2003-2768.

3. Problems to be Solved by the Invention

When a high alumina content of at least 85% by weight is employed for producing a ceramic cylindrical body, it is difficult to carry out extrusion-molding due to the high alumina content. This is one of the main reasons why the powder-pressing process, which requires the spray-drying of an alumina slurry and additional complicated works, has been conventionally adopted for forming the cylindrical ceramic body.

Since a very high temperature of more than 1500° C. has been required to obtain an airtight ceramic container having a high alumina content for use in a vacuum switch, etc., the processing cost, including furnace cost and energy cost for producing a high-alumina content ceramic body, has been a substantive problem.

Notably, air-tightness is one of the most important requirements for a vacuum switch and a circuit contactor. A circuit contactor for use in a hybrid or electric engine using a high power battery or capacitor requires hermetic encapsulation of a non-oxidative gas such as hydrogen inside the contactor.

SUMMARY OF THE INVENTION

It is therefore a first object of the invention to provide a reliable and low-cost switch container comprising a hollow ceramic body capable of hermetically encapsulating or sealing switch members therein, and particularly usable for a vacuum switch, a circuit breaker, a circuit contactor or the like requiring a high airtight or rather hermetic seal encapsulation for contacting or disconnecting switch-electrodes therein.

A second object of the present invention is to provide a method for producing a reliable and low-cost hollow ceramic body for use as a switch container capable of hermetically sealing switch members therein and usable as a ceramic container for a vacuum switch, a circuit breaker, a circuit contactor and the like.

The above first object of the invention has been achieved by providing a switch container for hermetically sealing switch members therein, comprising a hollow ceramic body, wherein the ceramic body contains 45 to 65% by weight of alumina and 35 to 55% by weight of crystallized glass.

In a first aspect of the invention, when the hollow ceramic body contains mullite, at least the following advantages are realized.

An advantage of the above switch container is that the hollow ceramic body itself has a high breakdown voltage (given in units of kV/mm) higher than or at least comparable to a conventional hollow ceramic body containing 85% by weight or more alumina. Another advantage of the inventive hollow ceramic body is that it has good air-tightness and good strength at least comparable to a conventional one. Therefore, the inventive hollow ceramic body is usable as a hermetic seal container for a vacuum switch, a circuit breaker, a circuit contactor, etc., requiring good insulation and high air-tightness. In addition, formation of a reliable airtight metallization on the hollow ceramic body is advantageously attained.

These advantages are more reliably secured, according to a second aspect of the invention, when the hollow ceramic body exhibits an X-ray diffraction pattern having an X-ray diffraction peak intensity of alumina that is higher than that of mullite, and an X-ray diffraction intensity peak of mullite that is higher than that of any other substance except alumina.

In other words, a desirable ceramic switch container is attained when the aforementioned crystallized glass contains mullite. Notably, mullite is a covalent orthorhombic crystal formed from $Al_2O_3$ and $SiO_2$ and has a chemical constitution expressed by $Al_{4+2x}Si_{2-2x}O_{10-x}$, where x=0.25-0.4.

Specifically, when the X-ray diffraction peak intensity of alumina observed at a glancing angle (2θ) of 35.152 degrees is greater than that of mullite observed at a glancing angle (2θ) of 26.267 degrees, and when the X-ray diffraction peak intensity of any other substance such as quartz is not substantially detected or more particularly does not exceed that of mullite, a ceramic switch container according to a preferred embodiment of the invention is obtained. In this X-ray diffraction analysis, X-ray scanning is carried out at a diffraction-scanning angle of 20-60 degrees using a Cu target and a Ni filter.

More specifically, as shown in FIG. 8, a total of six X-ray diffraction intensity peaks of alumina crystals are observed at glancing angles (2θ) of 25.578, 35.152, 37.776, 43.355, 52.549 and 57.496 degrees, respectively, and these peaks are all higher than the two X-ray diffraction intensity peaks of mullite observed at glancing angles (2θ) of 26.267 and 40.847 degrees, respectively, when X-ray diffraction analysis is carried out on the hollow ceramic body constituting the switch container according to the invention.

Another important advantage of the hollow ceramic body according to the invention is that a surface of the ceramic body is reliably metallized at low temperature so that various types of metal members such as an end cap and an arc shield cover can be strongly and air-tightly brazed and bonded onto the ceramic body. Notably, the term "metallization" as used herein means formation of a metallizing layer on a surface of the ceramic body. The following composition, for example, is recommended for the low temperature metallization: a composition comprising 70-94% by weight of at least one of tungsten and molybdenum, 0.5 to 10% by weight of nickel, and 2 to 23% by weight of silica. A feature of this low temperature metallization composition is that 0.5 to 10% by weight of nickel is contained therein so that the metallization is carried out at a low temperature of 1080 to 1250° C. in a hydrogen gas atmosphere. Up to 3% by weight of titanium and/or manganese may be added to the composition of the metallizing layer.

In order to hermetically bond metal members such as an end cap and an arc shield cover to the metallizing layer formed on the ceramic body by means of brazing, the metallizing layer is further baked or plated with a metal layer such as a Ni, Cu, Au or Ag layer, preferably a nickel plating layer, so as to facilitate joining the metal member and the metallizing layer via a brazing material such as an Ag, Au, Al, Ti, In or Sn based brazing material, and mixtures thereof, preferably via a Ag—Cu eutectic alloy. The hollow ceramic body for use in a hermetically sealed product such as a vacuum switch and a circuit contactor is normally cylindrical or tubular in shape. Two open ends of the cylindrical ceramic body are metallized by forming a metallizing layer comprising the aforementioned metallization composition, and the metallizing layer is metal-plated, preferably nickel-plated, so that the metal member can be hermetically bonded thereto by the brazing material.

When the switch container, which comprises a hollow ceramic body, adopts a cylindrical or tubular form, a ceramic body having a transverse strength of at least 150 Mpa as measured in accordance with Japanese Industrial Standards: JIS 1601(1981) provides the requisite strength for a switch container such as a vacuum switch container and a circuit contactor.

When a higher breakdown voltage is required for the hollow ceramic body, a glazing layer having a thickness of 0.05 to 0.20 mm and containing silica may be applied to an outer surface of the hollow ceramic body.

The second object of the invention has been achieved by providing: a method for producing a switch container for encapsulating and/or hermetically sealing a switch member therein, which comprises adjusting an amount of alumina in preparation of a raw material comprising alumina powder and clay powder; extruding the raw material into an unfired (green) hollow ceramic body; and firing the unfired hollow ceramic body at a temperature of 1200 to 1350° C. to obtain a hollow ceramic body containing 45 to 65% by weight of alumina and 55 to 35% by weight of crystallized glass the hollow ceramic body having an X-ray diffraction peak intensity of mullite that is higher than that of other substances except alumina, as measured in a X-ray diffraction analysis. In a preferred embodiment, the method comprises forming an unfired metallizing layer on a surface of the fired cylindrical ceramic body; and firing the green metallizing layer at a temperature of 1080 to 1250° C. in a hydrogen gas atmosphere to obtain a fired metallizing layer hermetically bonded to the fired cylindrical ceramic body, the fired metallizing layer containing about 70-94% by weight of at least one of tungsten and molybdenum, about 0.5 to 10% by weight of nickel, and about 2 to 23% by weight of silica.

An advantage of the above method according to the invention is that a low-cost and reliable ceramic container for a hermetically sealed product such as a vacuum switch and a circuit contactor can be obtained by extrusion-molding a raw material comprising alumina and clay. This is mainly because the extrusion-molding process is inexpensive compared to a conventional process including spray-drying and powder-pressing, and because a polycrystalline ceramic containing alumina and mullite is obtained through a comparatively low temperature firing process.

Notably, clay is a natural resource material such as kaolinite and halloysite, comprised of microscopic fine particles mainly comprising aluminosilicate. Most clays comprise about 40-80% by weight of $SiO_2$, about 10-40% by weight of alumina and up to about 25% of other substances such as $Fe_2O_3$, $TiO_2$, CaO, MgO, $K_2O$, and $Na_2O$. Since the clay comprises very fine particles and has high plasticity, it is easy to process a raw material through an extrusion-molding and the clay allows for a relatively low firing temperature if included in the raw material.

An $Al_2O_3$ powder is added to a raw material comprising a clay powder to result in a fired hollow ceramic body containing 45 to 65% by weight of alumina and 35 to 55% by weight of crystallized glass comprising mullite, according to the invention. The proportion of clay to the raw material comprising alumina powder and clay powder should fall in the range of 20 to 50% by weight, according to a preferred aspect of the method according to the invention. For extrusion-molding, an adequate amount of water is added to the raw material. In addition to adding alumina powder for adjusting the alumina content of the raw material, a suitable amount of feldspar (as a sintering conditioner) and/or silica stone (as a plasticity adjustor) may be added.

Another advantage of the above method is that a reliable and airtight metallizing layer can be formed on the ceramic container using a low temperature metallization process. The metallizing layer formed on the surface of the ceramic body by the low temperature metallization exhibits good air-tightness (i.e., a high degree of hermetic seal) and high bonding strength at the interface between the metallized surface of the ceramic body and the metallizing layer formed thereon.

The above method may further comprise baking or plating a metal layer such as a Ni, Cu, Au or Ag layer, preferably plating a nickel layer, on the surface of the metallizing layer. As a result, brazing a metal cap onto the metal-plated metallizing layer with a brazing material such as an Ag, Au, Al, Ti, In or Sn based brazing material, and mixtures thereof, preferably via an Ag—Cu eutectic alloy, becomes feasible so that a reliable switch container for hermetically sealing switch members therein is attained.

Since the hollow ceramic body comprising 45 to 65% by weight of alumina is produced by firing a green hollow ceramic body comprising alumina powder and clay powder at a firing temperature of 1200 to 1350° C. much lower than the conventional firing temperature of at least 1500° C., and since a low temperature metallization of a surface of the ceramic body is reliably attained, according to the method of present invention, furnace energy consumption is greatly reduced so as to obtain a low-cost and reliable hollow ceramic body.

In addition, the present invention allows for extrusion-molding such that spray drying of a slurry, which is required for a conventional powder-pressing process, can be avoided. As such, the production cost of the hollow ceramic body is further reduced.

Notably, the metallization temperature recommended for metallizing the hollow ceramic body, according to the invention, is lower than the firing temperature of the hollow ceramic body. Otherwise, deformation of the hollow ceramic body and/or metallization adhesion failure could occur. If alumina content is more than 65% by weight, it is difficult to prepare a green hollow ceramic body precursor using an extrusion-molding process. If the alumina content is less than 45% by weight, less polycrystalline alumina and too much mullite is formed in the hollow ceramic body as observed by X-ray diffraction analysis (see FIG. 9). As a result, the desired switch container having good strength and capable of forming reliable airtight metallization thereon is not obtained.

DESCRIPTION OF REFERENCE NUMERALS

Figure 1:
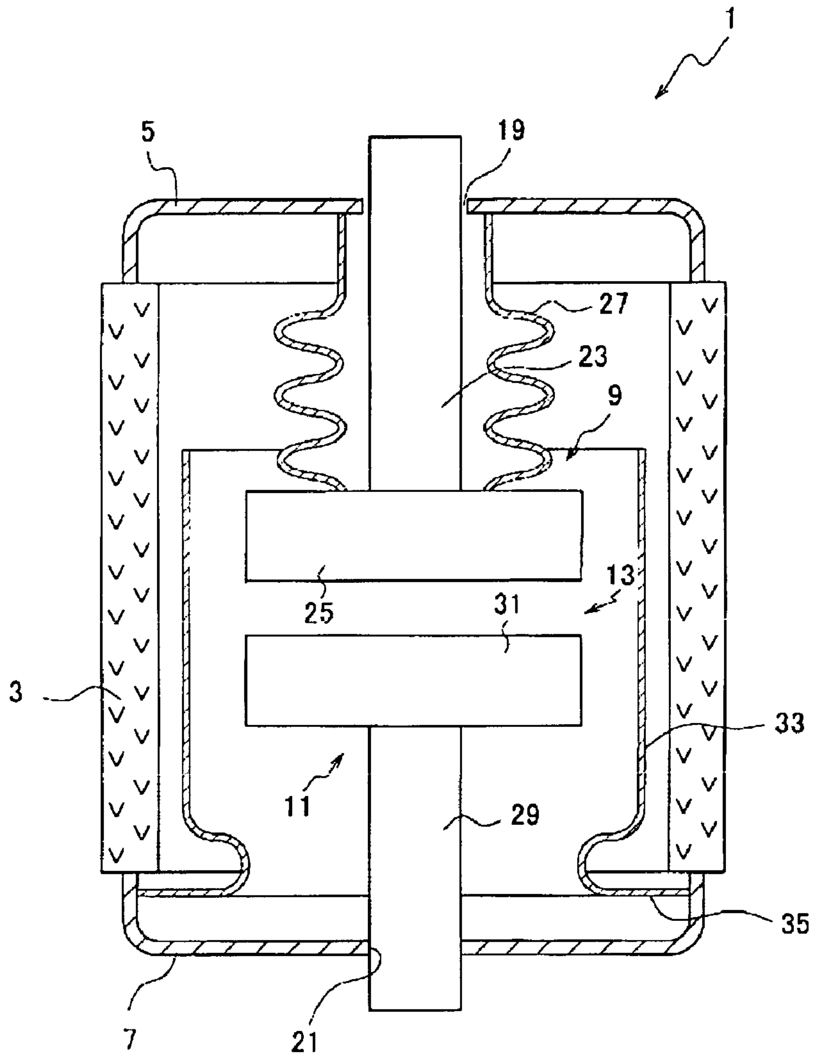
FIG. 1 shows an explanatory cross-section of a vacuum switch 1 container hermetically sealing switch members therein comprising a hollow ceramic body 3, according to an embodiment of the invention.

Reference numerals used to identify various structural features shown in the drawings include the following.

1: switch
3, 51, 81: hollow ceramic body (ceramic cylindrical tube)
5, 55: first metallic end cap
7: second metallic end cap
9: movable electrode
11: fixed electrode
13: contacting point
23: movable shaft
25, 31: electrodes (switch members)
27: metallic bellows
29: shaft of fixed electrode
41: low-temperature metallizing layer
43: Ni-plating layer
45: brazing layer
57: switch container for hermetic sealing test
61: helium detector
71: test piece cut out from ceramic cylindrical tube
73, 75: copper electrodes of breakdown voltage tester
83: metal pins brazed on metallized ceramic body
85: holding tool in pulling test
87: holding member

DETAILED DESCRIPTION OF THE INVENTION

A high air-tightness, and particularly, a hermetic seal is necessary for a vacuum switch and a circuit contactor incorporating switch members therein. In addition, high breakdown voltage and high strength are necessary for the vacuum switch. The contactor is a switch that controls comparably low voltage and low power, not necessarily in a vacuum but in an insulating gas such as hydrogen gas. The vacuum switch is a heavy load switch for switching high voltage and high power current, and incorporates switch members such as electrodes in a vacuum container constituting the vacuum switch.

An embodiment of a vacuum switch is described hereinafter in detail by reference to the drawings, but the present invention should not be construed as being limited thereto.

Figure 2:
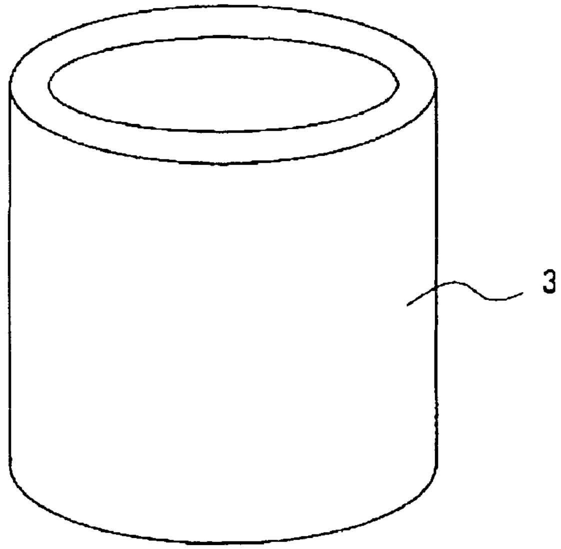
FIG. 2 shows a perspective view of the hollow ceramic body 3 of FIG. 1, which is a ceramic cylindrical tube.

Referring to FIG. 1, a vacuum switch 1 comprises a hollow ceramic body for electrical insulation, which is shaped as a ceramic cylindrical tube 3 as seen in FIG. 2. First and second metallic end caps 5, 7 are hermetically joined to open ends of the ceramic cylindrical tube 3. Inside the cylindrical tube 3, an electrical contact point 13 is made between a movable electrode 9 that slides on first end cap 5 in an axial direction of the ceramic cylindrical tube 3 and a fixed electrode 11 that is fixed to the second end cap 7.

The ceramic cylindrical tube 3 is a fired hollow ceramic body containing 45 to 65% by weight of alumina and 35 to 55% by weight of mullite and has an inner diameter of about 80 mm a wall thickness of about 5 mm, and a longitudinal length 100 mm. A glaze layer (not shown) having a thickness of about 0.15 mm may be provided on an outer circumferential surface of ceramic cylindrical tube 3.

The first and second end caps 5 and 7 are formed from a discoid plate of KOVAR (Fe—Ni—Co alloy) each having a center hole 19, 21, respectively. The movable electrode 9 composes a movable shaft 23 that is inserted through the hole 19 and an electrode 25 attached to the end of movable shaft 23. This movable electrode 9 allows an on/off switching operation in a vacuum condition by a pleated metallic bellows 27.

The fixed electrode 11 comprises a discoid electrode 31 attached to the end of a shaft 29 fixed in the hole 21. An arc shield cover 33 is provided such that it embraces the contact point 13 cylindrically. The arc shield cover 33 is brazed to the second end cap 7 in a lower flange area 35 of the ceramic cylindrical tube 3. This construction prevents metallic vapor generated from the contact point 13 at the time of turning on/off current from scattering to an inner circumferential wall of the ceramic cylindrical tube 3.

Figure 3:
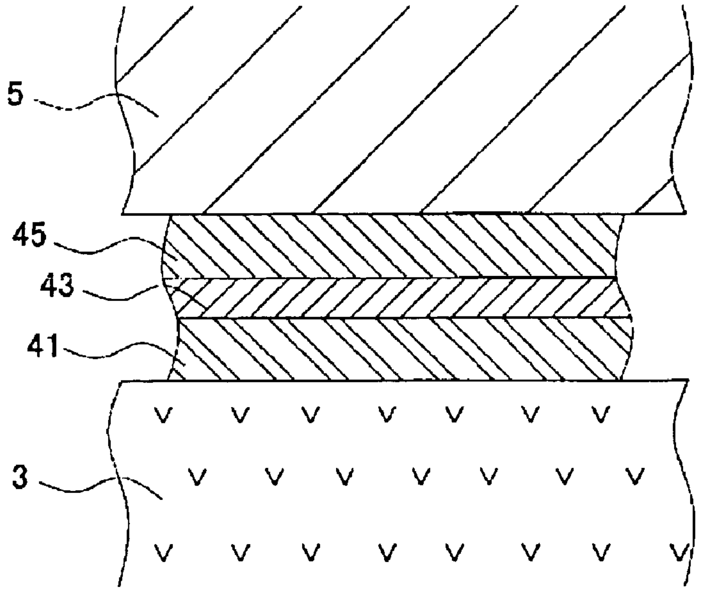
FIG. 3 shows an enlarged cross-section of a brazed end of the hollow ceramic body 3.

FIG. 3 shows an enlarged cross-section of a typical end area of the ceramic cylindrical tube 3. The metallizing layer 41 is formed on a circular end of the cylindrical tube 3 by low temperature metallization. A nickel-plating layer 43 is formed on the metallizing layer 41. The first end cap is bonded to the nickel-plated metallizing layer with a brazing material layer 45 so that the first end cap 5 is air-tightly, or more particularly, hermetically connected to the ceramic cylindrical tube 3. In a similar way, the second end cap 7 is air-tightly connected to the ceramic cylindrical tube 3.

The metallizing layer 41 comprises preferably 70-88% by weight of Mo, 0.7-5.5% by weight of Ni, and 3 to 18% by weight of $SiO_2$. The metallizing layer is formed by firing at a temperature of 1080 to 1250° C. Notably, W or a mixture of Mo and W may be used instead of Mo for the composition of the metallizing layer 41.

Next, a method of producing the ceramic cylindrical tube 3 is described.

Alumina powder, clay powder comprising kaolinite, feldspar, silica stone and water are placed into a mill, finely ground and mixed to produce a raw material for extrusion-molding. In this process of forming the raw material, the amount of alumina is adjusted, based on a pre-analyzed alumina content of the raw material, so as to produce a fired hollow ceramic body containing 45 to 65% by weight of alumina as analyzed by EPMA (Electron Probe Microbeam Analysis). When about 50-80% by weight of alumina constitutes the raw material except water, the desired hollow ceramic body containing 45 to 65% by weight of alumina and 35-55% by weight of crystallized glass comprising mullite is attained.

Next, the raw material produced by the above-process is placed into an extrusion-molding machine so as to extrude a raw tubular body having, e.g., an outer diameter of 108 mm and an inner diameter of 96 mm through an extrusion-mouth ring thereof. This raw tubular body is cut into a green cylindrical tube having, e.g., a length of about 120 mm and then dried.

Notably, a glaze-slurry may be applied to an outer surface of the green cylindrical tube, dried and fired in case a higher breakdown voltage is required, although the hollow ceramic body according to the invention has a high enough breakdown voltage normally required for the vacuum switch. The following glaze composition is recommended for that purpose: a glaze composition comprising about 75% by weight of $SiO_2$, about 15% by weight of $Al_2O_3$, about 5% by weight of $K_2O$, about 4% by weight of MgO and 1% by weight of $Na_2O$.

The green cylindrical tube is placed in a furnace and fired at 1300° C. in an ambient atmosphere. Both ends of fired cylindrical tube are ground so as to obtain flat ends of a ceramic cylindrical tube 3 for metallization.

Next, a paste of low temperature metallization material is applied to both ends of the ceramic cylindrical tube 3 and dried to form green metallizing layers having a thickness of about 0.03 mm. This paste is a compound comprising about 87% by weight of the aforementioned metallization composition and about 13% by weight of an organic binder containing ethyl cellulose or the like organic binder. The low temperature metallization is performed by firing a green metallizing layer at 1100 to 1200° C. in a hydrogen atmosphere so that the metallizing layer 41 is sintered and bonded to the ends of the ceramic cylindrical tube 3.

Next, the metallizing layers 41 sintered onto the ends of the ceramic cylindrical tubes are plated by nickel so as to form plating layers 43 having a thickness of about 0.015 mm. Then, first and second end caps 5 and 7 are brazed and connected to the plating layers 43 by the brazing layer 45 comprising an eutectic silver-copper alloy. This brazing process is conducted at a temperature of about 830° C.

The switch members such as the fixed electrode 9 and the movable electrode 11 should be assembled inside of the ceramic cylindrical tube 3 and also the arc shield cover 33 should be brazed on the second end cap 7 before brazing the first and second end caps 5 and 7 onto the nickel-plated metallizing layer 43.

As described above, since the ceramic cylindrical tube 3 is produced by extrusion-molding using a low content alumina ceramic composition comprising clay, and since the low temperature metallizing layers 41 are formed on the open ends of the ceramic cylindrical tube 3 for hermetically bonding the first and second end caps 5 and 7 therewith, the production process is simplified and the production cost is greatly reduced. Furthermore, because the firing temperature of low temperature metallization is lower than that of the ceramic cylindrical tube 3, it is unlikely to cause any adverse effect such as deformation of the ceramic cylindrical tube 3. As a result, the end caps 5 and 7 connected thereto ensure a reliable, hermetic seal.

Furthermore, the ceramic cylindrical tube 3 in itself secures the necessary switch properties such as strength and insulation property, as is hereinafter explained with respect to the following Examples which confirm the advantages of the present invention.

EXAMPLES

As shown in Table 1, a total of nine kinds of experimental ceramic switch containers (namely, ceramic cylindrical tubes) each having a different alumina content and the same other materials, and each employing the same metallization composition except Sample No. 9, were made by the same aforementioned processes.

The metallization on Sample No. 9 was carried out using a metallization composition comprising 92-95% by weight of Mo and 5-8% by weight of Mn, and by sintering the composition at a temperature of about 1380° C. in a hydrogen gas atmosphere. Samples Nos. 1-7 were prepared by extrusion-molding and firing at about 1300° C. Samples Nos. 8-9 were prepared by a conventional process of spray-drying and powder-pressing, and firing at about 1300° C. and about 1550° C., respectively. The alumina contents of the ceramic cylindrical tubes after firing were each determined by means of fluorescent X-ray element analysis. Samples Nos. 3-7 are examples according to the present invention, and Samples Nos. 1, 2, 8 and 9 are comparative examples.

(1) Hermetic Seal Testing

Figure 4:
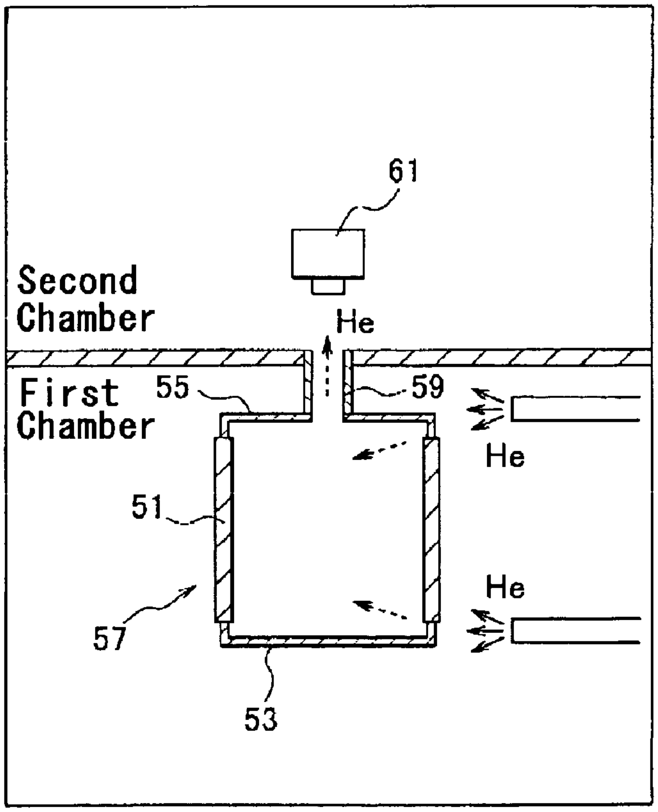
FIG. 4 is a diagram showing a method of hermetic testing.

As schematically illustrated in FIG. 4, end caps 53 and 55 made of KOVAR plate were each brazed and bonded to top and bottom ends of a ceramic cylindrical tube 51, in accordance with the aforementioned embodiment, such that the open ends of a switch container 57 similar to an actual vacuum switch container were air-tightly closed.

A pipe 59 was formed by extending a center portion of the end cap 55 and hermetically bonding to an opening of a second chamber of a hermetic seal-testing device. As such, gas inside the switch container 57 could communicate through the pipe 59 to the second chamber, while the switch container is placed in the first chamber of the hermetic seal-testing device. A helium detector 61 (Helium Leak Detector supplied from Veeco Corp.) for detecting He was placed in the second chamber and close to an opening of the pipe 59, as shown in FIG. 4.

Then, Helium (He) gas was supplied to the first chamber where the switch container 57 was located. On the other hand, a vacuum state of about $10^{-7}$ Torr was formed in the second chamber so that the inside of the switch container 57 was in the same vacuum state as the second chamber.

Under this condition, a leak test was conducted to check whether the helium detector 61 could detect any He leaking from the circumference of the switch container 57 into the inside of the switch container. If the helium detector 61 detects helium, it means that the switch container 57 has a compromised hermetic seal or compromised air-tightness. In this way, a leak test or more particularly, hermetic evaluation was carried out on every sample.

The results of the hermetic evaluation are shown in Table 1, wherein the mark (O) indicates no He-leakage. As is apparent from Table 1, all the samples had no He-leakage and showed good hermetic performance. This means that the hollow ceramic body according to the invention is capable of being metallized. In addition, the low temperature metallization using the aforementioned metallization composition provides excellent air-tightness between the metal end caps and the ends of the ceramic cylindrical ceramic tube.

(2) Transverse Strength Measurement

Two ceramic pieces 50 mm in length, 4 mm in width and 3 mm in thickness were cut out from each sample for measuring the transverse strength thereof.

The transverse strength measurement was conducted on each sample, according to Japanese Industrial Standards: JIS R1601 (1981), which specifies a three-point bending test.

The transverse strength measurement was carried out before and after heat treatment at a first temperature elevation of up to 1200° C. and cooling to room temperature and at a second temperature elevation of up to 800° C. and cooling to room temperature.

The results of the transverse strength measurements are shown in Table 1. As is apparent from Table 1, the strength of the ceramic body decreases as the alumina content decreases. However, Sample Nos. 3-7 according to the present invention show adequate strength, and have a transverse strength value higher than 150 Mpa that is minimally required for a vacuum switch container and a contactor container.

(3) Breakdown Voltage Measurement

Figure 5:
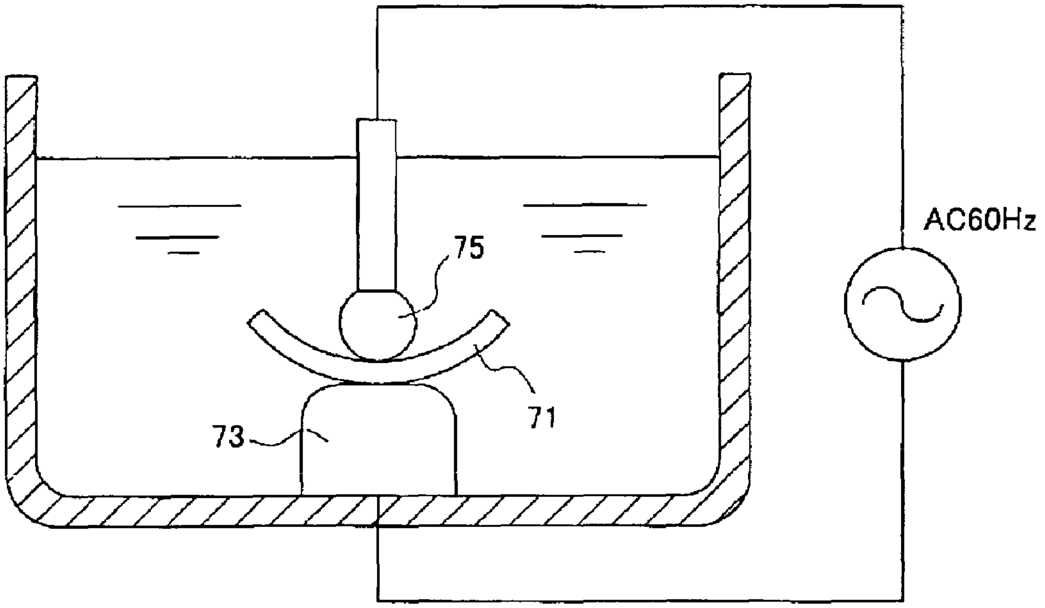
FIG. 5 is a diagram showing a method of breakdown voltage testing.

As shown in FIG. 5, test piece 71 was cut out from the ceramic cylindrical tube along its axial direction. Then, the test piece 71 was placed into insulative oil having low viscosity, such as mineral oil and alkylbenzene, as specified in Japanese Industrial Standards: JIS C2320 (1993), and so as to contact copper electrodes 73 and 75. Then, an alternating current voltage (60 Hz) was applied across the copper electrodes 73 and 75 and the voltage was gradually increased.

The breakdown voltage causing dielectric breakdown was measured by a breakdown voltage tester supplied by Meiji Denki Co. The results of the test are shown in Table 1. As is apparent from Table 1, the breakdown voltage increases as the alumina content decreases. Samples Nos. 3-7 according to the invention showed adequate breakdown voltage higher or at least comparably as high as that of Sample No. 9 made by a conventional method.

(4) Bonding Strength Test on Metallization

Figure 6:
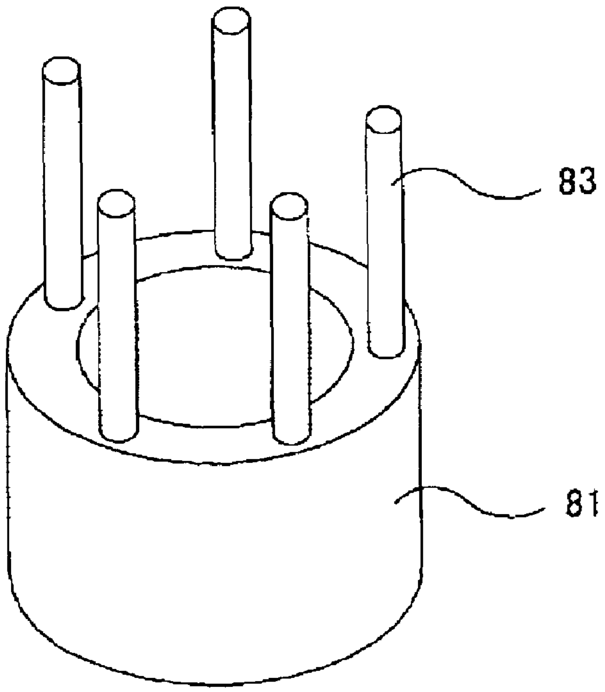
FIG. 6 shows a schematic perspective diagram for testing bonding strength of a metallizing layer formed on an end of a ceramic cylindrical tube 81.

As schematically shown in FIG. 6, five metal pins 83 made of KOVAR having a diameter of 3 mm and a length of 100 mm were brazed onto the nickel-plated metallizing layer formed on the end surface of each ceramic cylindrical tube 81.

Figure 7:
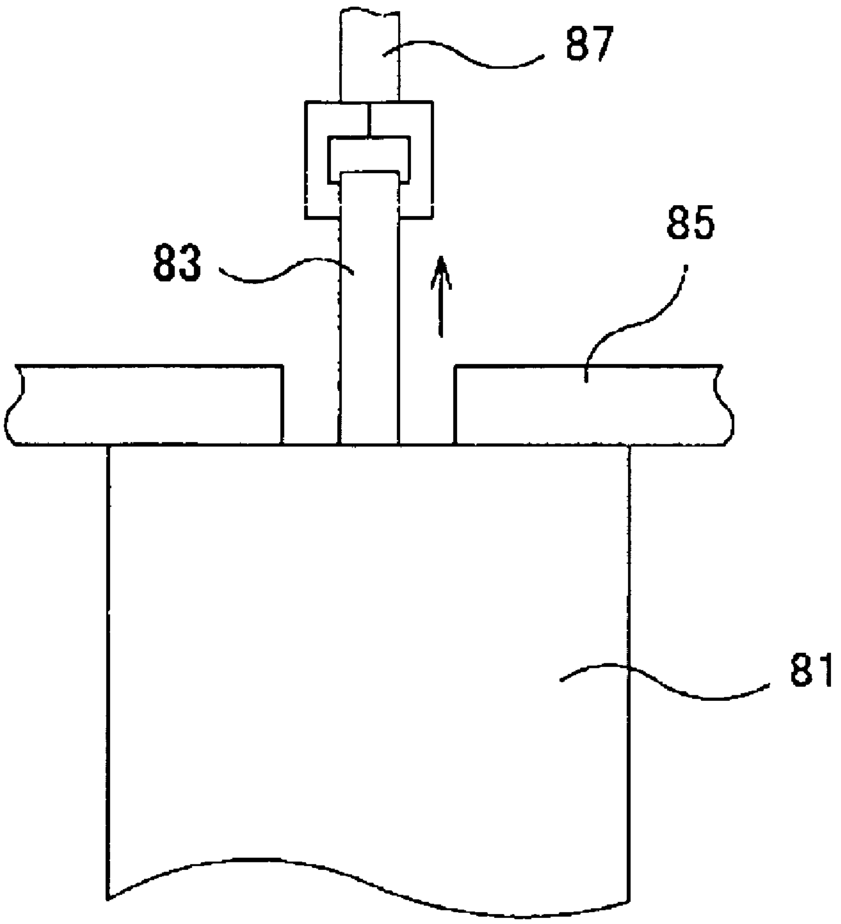
FIG. 7 is a schematic diagram illustrating a bonding test carried out on the test piece shown in FIG. 6.

Then, as schematically illustrated in FIG. 7, the metal pin 83 was chucked by a holding member 87 and pulled apart at a speed of 0.5 mm/min from the ceramic cylindrical tube 81 that was held by a holding tool 85. The pulling strength was recorded in an autograph supplied from Shimadzu Corporation until the metal pin 83 was separated. The bonding strength of metallization between the metal pin 83 and the ceramic cylindrical tube 81 was determined as being the maximum pulling strength value recorded in the autograph.

An average value of the maximum puling strengths of the five metal pins pulled apart from each ceramic cylindrical tube is given in Table 1 as the bonding strength of metallization. As is apparent from Table 1, the bonding strength of metallization decreases as the alumina content decreases. However, Sample Nos. 3-7 according to the present invention show a sufficient bonding strength, higher than 150 Mpa that is minimally required for a vacuum switch container and a contactor container.

(5) X-Ray Diffraction Analysis

Figure 8:
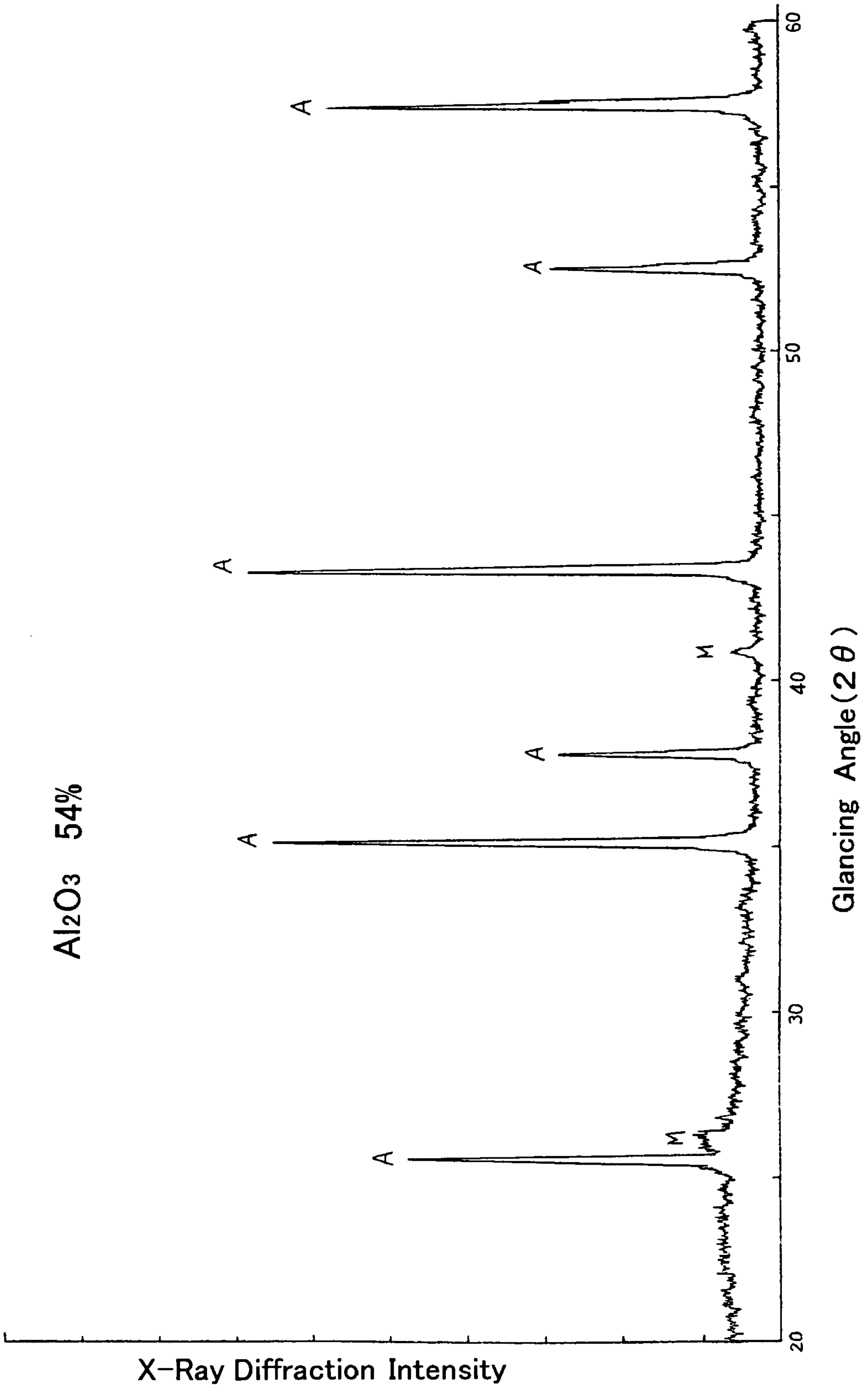
FIG. 8 is an X-ray diffraction pattern of a hollow ceramic body (Sample No. 5) according to the invention.
Figure 9:
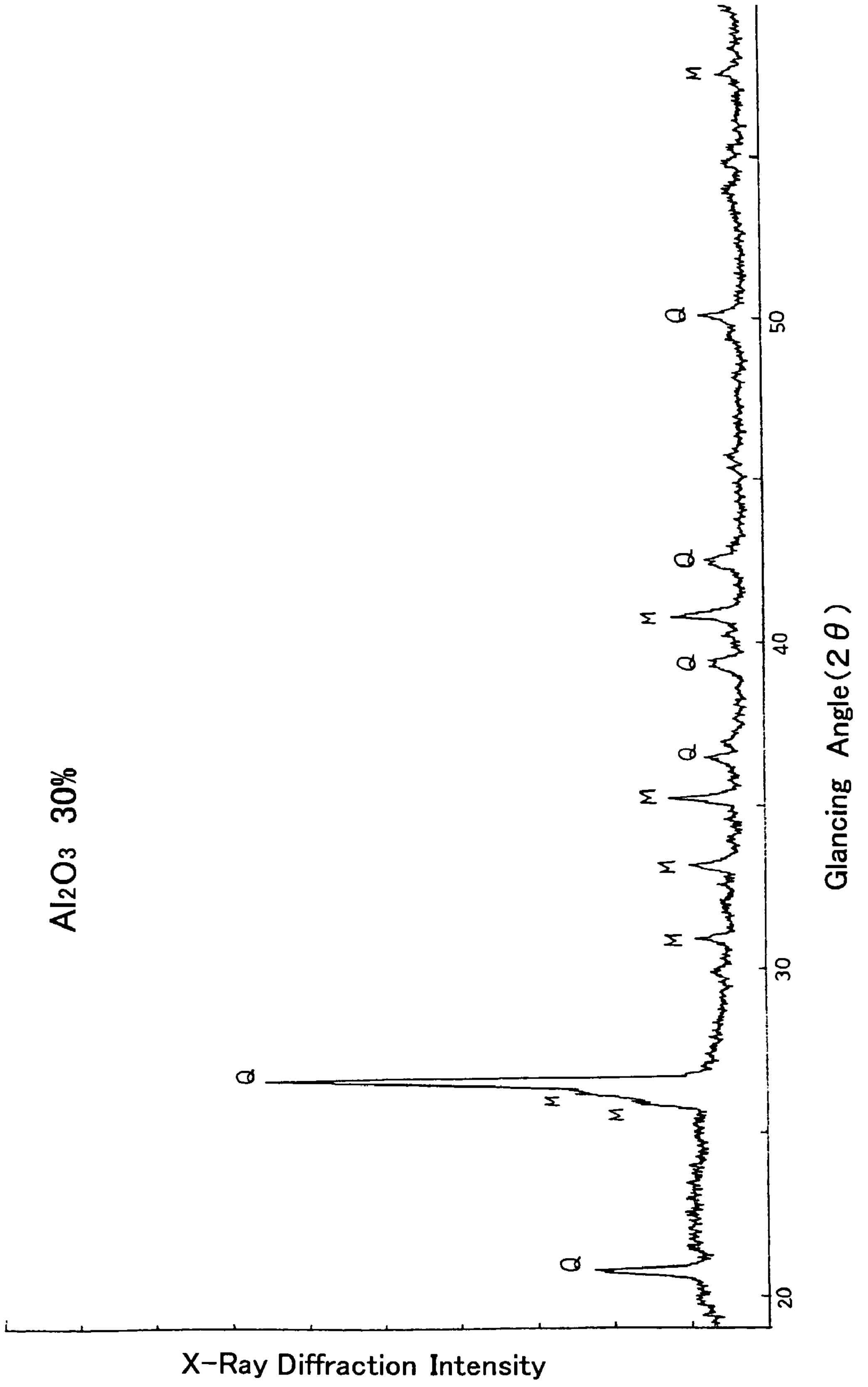
FIG. 9 is an X-ray diffraction pattern of a comparative hollow ceramic body (Sample No. 1).

An X-ray diffraction analysis was carried out on the samples so as to identify the types of microcrystalline substances formed in the ceramic body. FIG. 8 shows X-ray intensity as a function of glancing angle carried out on Sample No. 5 according to the invention. FIG. 9 shows X-ray intensity as a function of glancing angle carried out on Comparative Sample No. 1. The X-ray diffractometer parameters used in this analysis were as follows: target: Cu, filter: Ni, X-ray tube voltage: 35 kV, X-ray tube current: 15 mA, count full scale: 800 S/c, time constant: 1 sec., scanning speed: 2°/min., divergence slit: 1°, receiving slit: 0.15 mm, scattering slit: 1° and incident angle range (2θ): 20-60°.

The X-ray diffraction analysis patterns observed on Comparative Samples Nos. 1 and 2 were similar to FIG. 9. In these comparative samples, no noticeable X-ray intensity peaks of alumina were either detected in the X-ray diffraction analysis of FIG. 9, or rather, any X-ray intensity peaks of alumina present were lower than those of mullite. In Comparative Samples Nos. 1 and 2, many X-ray intensity peaks of mullite, as indicated by "M" in the same chart, were observed at the 2θ glancing angles of, for instance, 25.971°, 26.267°, 30.960°, 33.228°, 35.278°, 40.874° and 57.561°, and also many X-ray intensity peaks of quartz (polycrystalline $SiO_2$), identified by "Q" in the same chart, were observed at the 2θ glancing angles of, for instance, 20.859°, 26.639°, 36.534°, 39.464°, and 50.138°.

It is understood from the above X-ray diffraction analyses that when the alumina content does not exceed about 40% by weight in the hollow ceramic body, polycrystalline alumina that diffracts X-rays either is not formed, or formed to a lesser degree, and that mullite and/or quartz are formed instead. In other words, the alumina and clay contained in the raw material dissolves to form covalent mullite during firing of the green hollow ceramic body made from a raw material of low alumina content. If $SiO_2$ is abundant in clay and less $Al_2O_3$ is added to the raw material, the tendency is that less mullite and more quartz is formed.

The X-ray diffraction analysis patterns carried out on Samples Nos. 3-8 were similar to FIG. 8. In these samples, six X-ray diffraction intensity peaks of alumina, indicated by "A" in FIG. 8, were observed at the 2θ glancing angles of 25.578°,

TABLE 1

| | | Comparative Samples | | Present Invention | | | | | Comparative Samples | |
|---|---|---|---|---|---|---|---|---|---|---|
| Sample No. | | 1 | 2 | 3 | 4 | 5 | 6 | 7 | 8 | 9 |
| Alumina content (% Wt.) | | 30 | 41 | 45 | 48 | 54 | 61 | 65 | 70 | 92 |
| Production method | | Extrusion-Molding | | | | | | | Powder Press | Powder Press |
| Metallization Temp. (° C.) | | 1130 | 1130 | 1130 | 1130 | 1130 | 1130 | 1130 | 1130 | 1380 |
| Firm Temp. (° C.) | | 1300 | 1300 | 1300 | 1300 | 1300 | 1300 | 1300 | 1300 | 1580 |
| Production cost | | Low | Low | Low | Low | Low | Low | Low | High | High |
| Transverse Strength (MPa) | Before heat treatment | 154 | 170 | 198 | 213 | 200 | 232 | 235 | 240 | 380 |
| | After heat treatment | 136 | 151 | 172 | 177 | 180 | 200 | 216 | 218 | 380 |
| Breakdown Voltage (kV/mm) | | 11.9 | 11.5 | 11.2 | 11.1 | 9.5 | 8.8 | 8.7 | 8.5 | 8.5 |
| Bonding Strength of metallization (Mpa) | | 120 | 142 | 168 | 170 | 175 | 190 | 190 | 198 | 350 |
| Hermetic Evaluation | | ○ | ○ | ○ | ○ | ○ | ○ | ○ | ○ | ○ |
| Overall Evaluation | | x | x | ○ | ○ | ○ | ○ | ○ | Δ | Δ |

35.152°, 37.776°, 43.355°, 52.549° and 57.496°, and also two X-ray diffraction intensity peaks of mullite were identified, as indicated by "M" in the same chart, at the 2θ glancing angles of 26.267° and 40.847°.

The above X-ray diffraction analysis patterns demonstrate that Samples Nos. 3-8 of the invention comprised polycrystalline alumina and crystallized glass containing mullite. This is because the X-ray diffraction intensity peaks of crystalline substances other than polycrystalline alumina and mullite were not noticeably detected. Crystallized glass as used herein means glass containing mullite and some amorphous glass. The amount of amorphous glass formed in the crystallized glass is up to 25% by weight of the total crystallized glass. This is because the raw material comprising clay contains about 5-25% by weight of various glass-forming substances such as $Fe_2O_3$, $TiO_2$, CaO, MgO, $K_2O$ and $Na_2O$ other than mullite-forming substances of $Al_2O_3$ and $SiO_2$, and no detectable X-ray diffraction intensity peaks of crystals formed from these glass-forming substances were detected. Notably, the mullite is formed from $SiO_2$ and $Al_2O_3$ at a temperature of about more than 1200° C.

In sample No. 9, six X-ray diffraction intensity peaks of alumina similar to those in FIG. 8 were observed, but no detectable X-ray diffraction peaks for mullite were detected in the x-ray diffraction intensity pattern. Thus, formation of mullite is greatly suppressed since the hollow ceramic body of Sample No. 9 had a high alumina ceramic content.

Overall Evaluation of the Samples

All of transverse strength, breakdown voltage, bonding strength of metallization and air-tightness (hermetic seal) are necessarily required properties for the switch container and contactor. Comparative Samples Nos. 1 and 2 showed lower values in both transverse strength and bonding strength of metallization than Sample Nos. 3-7 of the invention, as shown in Table 1. This is probably because the alumina grains are not aggregated and instead, quartz is formed in the hollow ceramic bodies of Samples Nos. 1 and 2. The overall evaluation on Sample Nos. 1 and 2 are judged poor, as indicated by X in Table 1.

Comparative Samples Nos. 8 and 9 have a production cost problem. This is because it is difficult to utilize an extrusion-molding process for extruding a raw material containing about 70% or more by weight of alumina. Therefore, a costly powder-pressing process that requires spray-drying and/or other complicated works is necessary. The overall evaluation of Sample Nos. 8 and 9 was not so good, as indicated by Δ in Table 1, mainly because of the production cost.

In contrast, the overall evaluation of Samples Nos. 3-7 comprising 45-65% by weight of alumina and 35-55% by weight of crystallized glass containing mullite, according to the invention, was excellent as indicated by O in Table 1. This is because the transverse strength, voltage, air-tightness and capability of low temperature metallization were all satisfactory for the switch container, and most importantly because low cost extrusion-molding can be used for producing the hollow ceramic body.

The present invention is by no means limited to the foregoing Examples, but various types of embodiments may of course be executed without departing from the scope and spirit of the present invention.

For example, although a single-layer low temperature metallization was described in the aforementioned embodiments, a multilayer low temperature metallization may be adopted. For instance, a double-layer metallization may be used, which comprises formation of a bottom metallizing layer and a top alloy layer. The bottom layer may be made of a low temperature metallizing layer comprising 70 to 88% by weight of Mo and 0.7 to 5.5% by weight of Ni and the top layer may be made of an alloy comprising 35 to 75% by weight of Ni and 25 to 65% by weight of Cu and/or 2 to 30% by weight of Mn. The multilayer metallization is made by firing the layers at 1100-1200° C. in a hydrogen gas atmosphere.

The extrusion-molding process as described in forming the aforementioned switch container comprising a hollow ceramic body (e.g. a ceramic cylindrical tube) includes an injection molding process.

The best mode product according to the invention is attained when roughly middle values of the aforementioned compositions and temperatures are utilized.

This application is based on Japanese Patent Application No. 2004-119208 filed Apr. 14, 2004, incorporated herein by reference in its entirety.

What is claimed is:

1. A switch container for encapsulating and hermetically sealing switch members therein, comprising a hollow ceramic body, wherein the ceramic body contains 45 to 65% by weight of alumina and 35 to 55% by weight of crystallized glass, wherein the crystallized glass comprises mullite, and wherein the hollow ceramic body has an X-ray diffraction peak intensity of alumina that is higher than that of mullite and an X-ray diffraction peak intensity of mullite that is higher than that of any other substance except alumina, for a diffraction-scanning angle 2θ ranging between 20-60°, wherein the ceramic body is formed from raw materials comprising 50-80% by weight of alumina and 20-50% by weight of clay powder excepting water, the clay powder containing at least one glass-forming material selected from the group consisting of $Fe_2O_3$, $TiO_2$, CaO, MgO, $K_2O$ and $Na_2O$ in an amount of about 5-25% by weight other than mullite-forming substances of $Al_2O_3$ and $SiO_2$, further comprising, a metallizing layer formed on a surface of the hollow ceramic body, wherein the metallizing layer contains 70-94% by weight of at least one of tungsten and molybdenum, 0.5 to 10% by weight of nickel, and 2 to 23% by weight of silica.

2. The switch container as claimed in claim 1, further comprising a metal layer formed on the metallizing layer.

3. The switch container as claimed in claim 2, wherein the metal layer is a nickel plating layer.

4. The switch container as claimed in claim 2, further comprising a metallic cap brazed onto the metal layer by an alloy such that an opening of the hollow ceramic body is hermetically sealed.

5. The switch container as claimed in claim 4, wherein the alloy is a silver-copper eutectic alloy.

6. The switch container as claimed in claim 1, wherein the hollow ceramic body has a cylindrical and tubular shape.

7. The switch container as claimed in claim 1, comprising a glazing layer formed on an outer surface of the hollow ceramic body.

8. The switch container as claimed in claim 1, wherein the switch container is a vacuum switch container.

9. The switch container as claimed in claim 1, wherein the switch container is a contactor container.

10. The switch container as claimed in claim 1, wherein an amount of amorphous glass contained in the crystallized glass is up to 25% by weight of the total crystallized glass.

11. A method for producing a switch container for hermetically sealing switch members therein, said switch container comprising a hollow ceramic body, wherein the ceramic body contains 45 to 65% by weight of alumina and 35 to 55% by weight of crystallized glass, wherein the crystallized glass comprises mullite, wherein the ceramic body is formed from raw materials comprising 50-80% by weight of alumina and 20-50% by weight of clay powder excepting water, the clay powder containing at least one glass-forming material selected from the group consisting of $Fe_2O_3$, $TiO_2$, CaO, MgO, $K_2O$ and $Na_2O$ in an amount of about 5-25% by weight other than mullite-forming substances of $Al_2O_3$ and $SiO_2$, and wherein the hollow ceramic body has an X-ray diffraction peak intensity of alumina that is higher than that of mullite and an X-ray diffraction peak intensity of mullite that is higher than that of any other substance except alumina, for a diffraction-scanning angle 2θ ranging between 20-60°, further comprising, a metallizing layer formed on a surface of the hollow ceramic body, wherein the metallizing layer contains 70-94% by weight of at least one of tungsten and molybdenum, 0.5 to 10% by weight of nickel, and 2 to 23% by weight of silica, which method comprises adjusting an amount of alumina in preparation of a raw material comprising alumina powder and clay powder; extruding the raw material into an unfired hollow ceramic body; and firing the unfired hollow ceramic body at a temperature of 1200 to 1350° C.

12. The method for producing a switch container as claimed in claim 11, which further comprises forming an unfired metallizing layer on a surface of the fired cylindrical ceramic body, and firing the green metallizing layer at a temperature of 1080 to 1250° C. such that a fired metallizing layer is hermetically bonded to the fired cylindrical ceramic body, the fired metallizing layer containing 70-94% by weight of at least one of tungsten and molybdenum, 0.5 to 10% by weight of nickel, and 2 to 23% by weight of silica.

13. The method for producing a switch container as claimed in claim 12, which further comprises plating a metal layer on the surface of the fired metallizing layer, and brazing a metal cap onto the metal-plated metallizing layer by using an alloy.

14. The method for producing a switch container as claimed in claim 13, wherein the metal layer is a nickel plating layer, and the alloy is a silver-copper eutectic alloy.

* * * * *